United States Patent [19]

Corcelle et al.

[11] 4,251,708
[45] Feb. 17, 1981

[54] METHOD AND APPARATUS FOR ELECTRON BEAM WELDING

[75] Inventors: Francois Corcelle, Thoiry; Jean M. Comane, Parthenay, both of France

[73] Assignees: La Soudure Autogene Francaise; Commissariat a l'Energie Atomique; L'Air Liquide, Societe Anonyme pour l'Etude et l'Exploitation des Procedes Georges Claude; Societe Chimique de la Grande Paroisse, Azote et Produits Chimiques, all of Paris, France

[21] Appl. No.: 943,149
[22] Filed: Sep. 18, 1978
[51] Int. Cl.² .............................................. B23K 15/00
[52] U.S. Cl. ...................... 219/121 EM; 219/121 EB
[58] Field of Search .................. 219/121 EB, 121 EM

[56] References Cited
U.S. PATENT DOCUMENTS 3,585,349  6/1971  Kalbfell .......................... 219/121 EB
3,965,326  6/1976  Corcelle et al. ................ 219/121 EB

FOREIGN PATENT DOCUMENTS 1404827  5/1965  France ................................ 219/121 EB

*Primary Examiner*—Roy N. Envall, Jr.
*Assistant Examiner*—E. F. Borchelt
*Attorney, Agent, or Firm*—Lee C. Robinson, Jr.

[57] ABSTRACT

A method and apparatus for electron beam welding in which a single electron gun is displaced from one welding position to another welding position. A welding chamber is positioned at each welding position, and all of the chambers are located under a buffer vacuum enclosure. Preferably each chamber is associated with an individual vacuum pump. During the time the welding gun is operated at one position, the welded pieces are discharged and a set of pieces to be welded is placed at another position.

10 Claims, 4 Drawing Figures

METHOD AND APPARATUS FOR ELECTRON BEAM WELDING

The present invention relates to a method and an apparatus for electron beam welding.

One object of the invention is to provide automatic welding by means of a single electron gun used to carry out cyclical welding operations with at least two welding stations, thereby increasing the overall operating time of the electron gun, which is the most costly part of the apparatus. Another object of the invention is to provide a welding apparatus permitting the simplest rapid shift-over for welding parts with widely varying shapes.

Electron beam welding apparatus have already been proposed which make use of a closed area under a partial vacuum which contains the parts to be welded, and into which the electron welding beam penetrates. This partial vacuum is formed by a chamber which is generally connected by means of a valve to the end of the gun which is also under a vacuum. It is understood that in certain applications, the idle time of a cycle involving welding repressurizing, unloading of a set of welded parts, reloading of another set of parts to be welded, evacuating to create a welding vacuum, opening the valve sealing off the chamber from the gun, etc., represents a major portion of cycle time, whereas the duration of welding, i.e. the duration of the emitted electronic beam, is relatively short. In order to increase the operating time of the electron gun, use has been made of multiple welding chambers which are successively brought opposite a fixed gun. But although time is saved thanks to prior loading of parts to be welded in a chamber—or in a part of a waiting chamber—evacuation cannot be carried out until after the chamber, or part of the chamber, has been positioned in front of the gun and sealed to it.

In order to remedy this later disadvantage, it has been proposed to make use of sliding joints which make it possible to gradually create a welding vacuum in a welding chamber which has already been loaded with the set of parts to be welded while it is being shifted to the work station at the end of the electron gun. However, these sliding joints must withstand varying pressures, and must also pass in front of the opening in the welding chamber through which the electron beam will subsequently pass. The opening is consequently subjected to high stresses due to its wide dimensions and to the destructive action of weld debris represented by metal projected during the prior welding operations. This necessitates frequent maintenance and reduces the yield of the welding plant.

It has also been proposed that a pre-enclosure maintained under a nearly permanent welding vacuum be used with a gun in a fixed position. This pre-enclosure extends outward from a position immediately opposite and next to the gun, while a welding chamber is arranged adjacent the side of said enclosure opposite that facing the gun. Thanks to this arrangement, one may load a waiting laterally shifted welding chamber, while the creation of a vacuum in the working chamber is considerably speeded up by the buffer effect of the pre-enclosure under a vacuum. Nevertheless, idle time still occurs, particularly while unloading welded parts from a chamber and transferring them to another chamber.

Another attempt has been made to resolve these problems by causing a gun to shift from one welding station to another. Parts to be welded were successively loaded into one chamber while welding was carried out in another chamber, the welding chamber was then opened to atmosphere, and the welded parts were unloaded. In cases of this kind, the shuffle movement of the electron gun could be made along a joint which was not subjected to the destructive effects of passing over an opening in a chamber polluted with weld debris. Nevertheless, much time was lost evacuating the welding chambers.

In order to remedy this latter disadvantage, a proposal has been made to place a gun directly in a welding chamber, such that said gun can be displace in said welding chamber from an initial welding position to a second welding position. Parts to be welded are alternately introduced into said chamber through previously evacuated sealed chambers. This arrangement makes it possible to quickly weld parts while making maximum use of the gun, but it nevertheless presents various disadvantages, of which the most significant are an excessively large welding chamber, and a total lack of suitability to parts whose shapes are either special or different from those for which the apparatus was designed.

The present invention relates to a process and apparatus for welding by means of an electron beam which combines both maximum use of the electron gun, reduced size of the welding chambers and excellent adaptation to a wide variety of parts and/or seals to be welded.

This invention involves an electron vacuum welding process making use of a single electronic gun maintained under a high vacuum, and capable of being shifted between at least two positions separated in space. A plurality of welding chambers area respectively located in alignment with the positions of the electron gun. Provision is made for a pre-enclosure maintained nearly permanently under a welding vacuum between the electron gun and the welding chambers such that the electron beam penetrates through the pre-enclosure and into one of the welding chamber. The following operations are carried out in succession with respect to any single welding chamber: loading of the chamber with parts to be welded, closing and sealing of said welding chamber, opening said welding chamber to communicate with said pre-enclosure, placing the gun in communication with said pre-enclosure and emitting a welding beam toward said welding chamber which passes through said welding pre-enclosure. Thereafter the electron gun is sealed off from the pre-enclosure, and the pre-enclosure is sealed off from said welding chamber, after which said chamber is opened to atmosphere and unloaded. It is to be understood that the half-period is respect of the displacement of the gun from one welding position to another welding position is at the most equal to the duration of the above detailed operations made on a chamber from the beginning of the opening to the atmosphere until obtaining the correct welding pressure.

Because of this advantageous combination of processes which are individually known, idle loading, unloading, evacuating and opening to atmosphere times are considerably reduced, increasing the operating time of the electron gun to a maximum. Furthermore, the arrangement of an elongated pre-enclosure allows it to act as a support for the gun and the gun displacing mechanism. The various welding chambers may, at any time, be replaced by chambers whose structures and/or shapes are different and which are easily adaptable to parts or joints to be welded whose shapes are quite specific.

The characteristics and advantages of the invention shall be made clear by the following description which is furnished as an example, and which should be read by referring to the appended drawings, in which.

Figure 1:
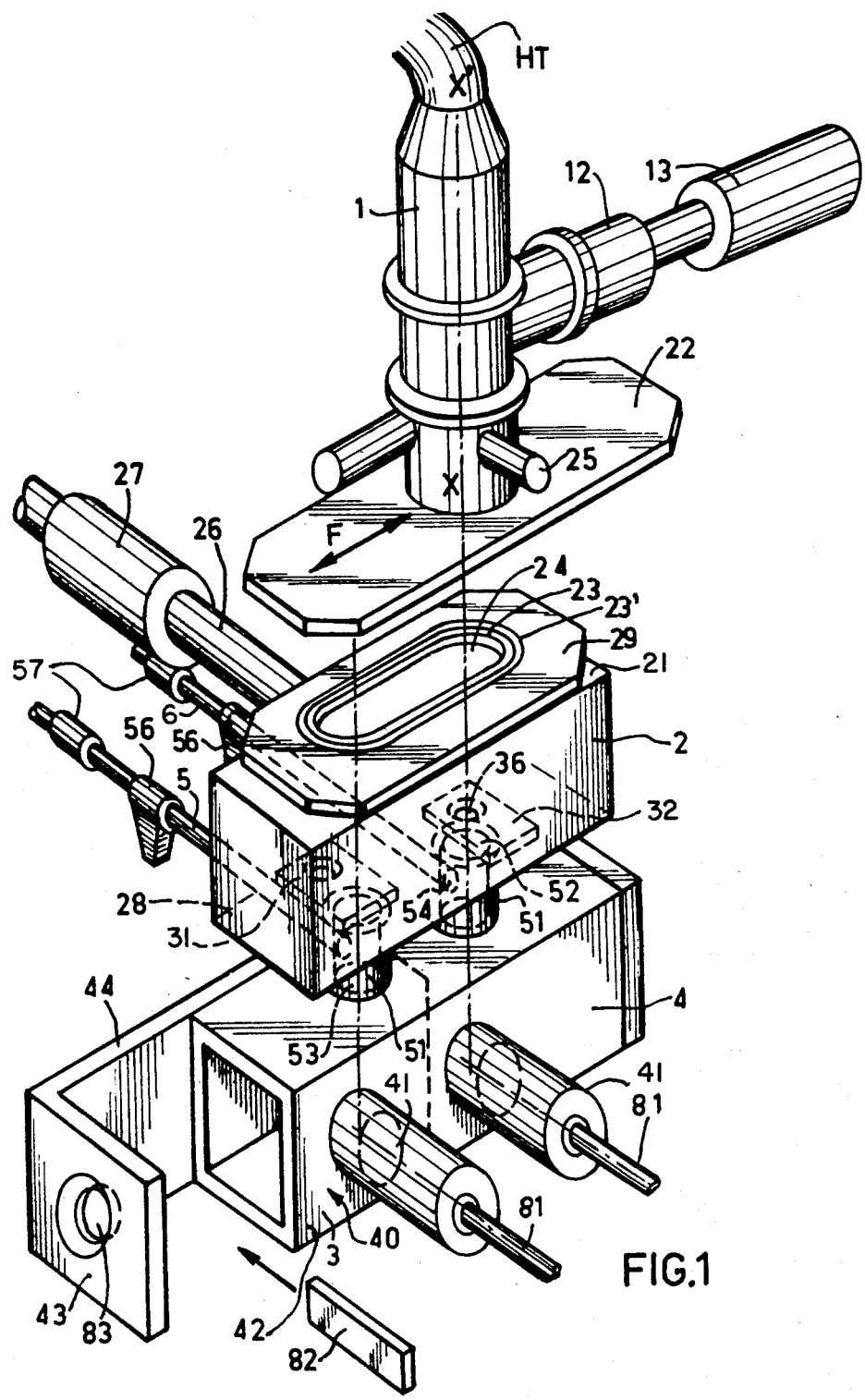
FIG. 1 is an exploded perspective view of a welding apparatus according to the invention.
Figure 2:
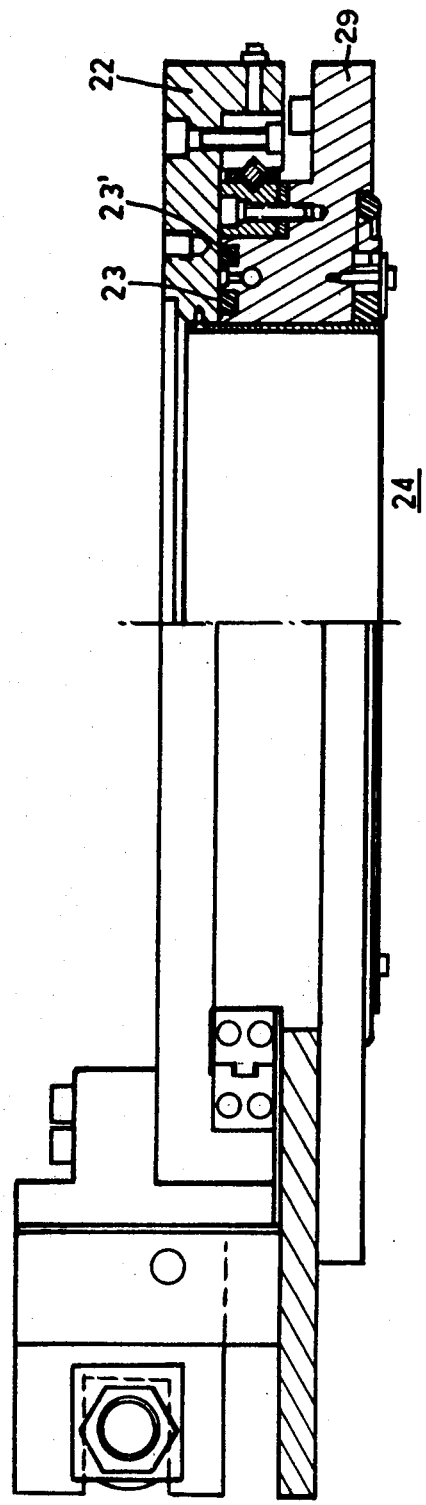
FIG. 2 is enlarged cross sectional view of the gun displacement mechanism for the apparatus of FIG. 1.
Figure 3:
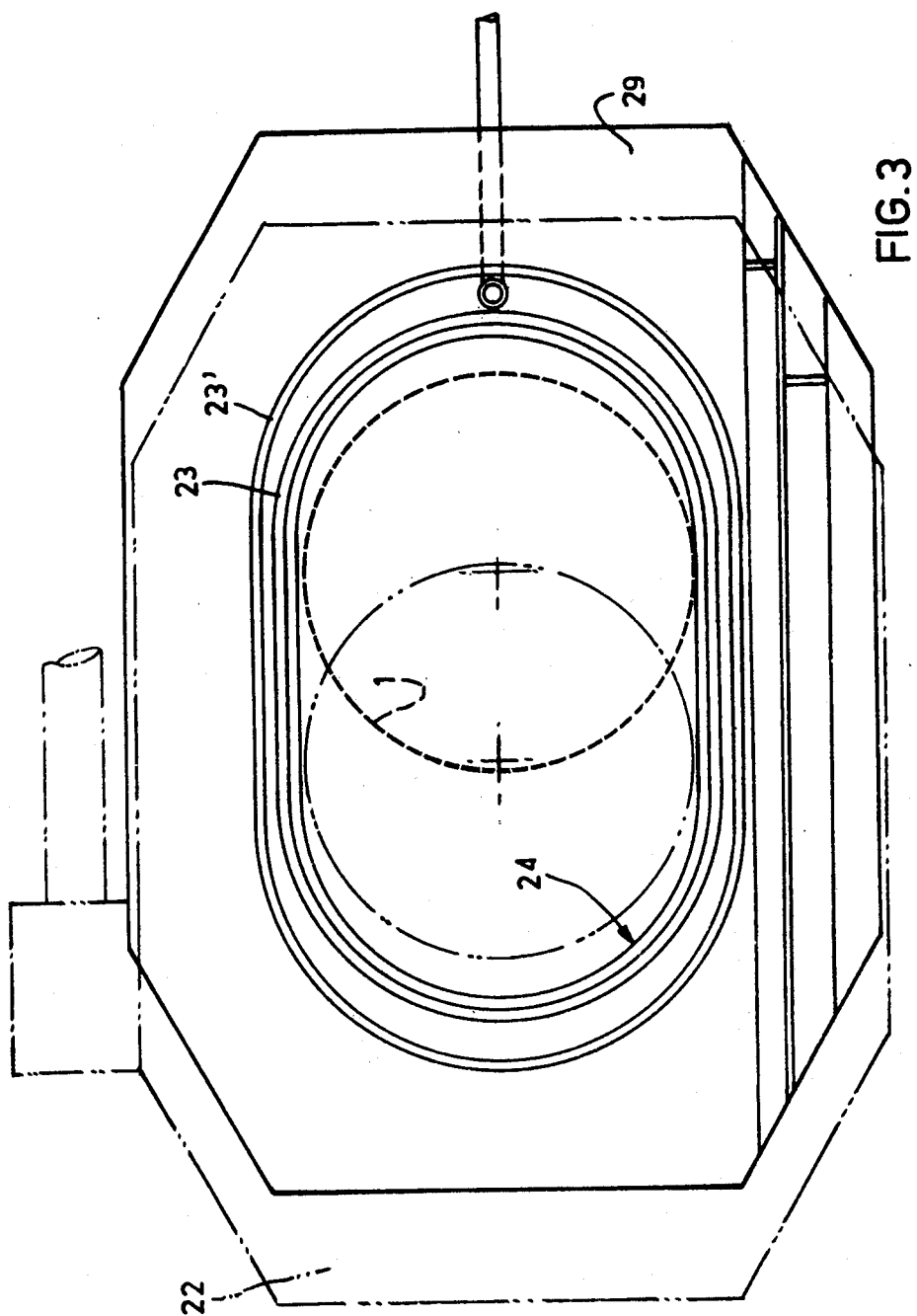
FIG. 3 is a schematic view from above of said displacement mechanism.

Referring to the appended drawings, a welding installation essentially includes an electron gun 1, whose design is known and not described, a buffer pre-enclosure 2 and two individual welding chambers 3 and 4. Electron gun 1 is mounted so as to be displaceable along line F, perpendicular to its axis X-X' and parallel to an upper wall 21 of the enclosure 2. This displacement along line F results from a sliding upper plate 22 sliding on a double inflatable joint 23 and 23' opposite an oval opening 24 made in wall 21 of the pre-enclosure 2. The double inflatable joint 23 and 23' is located in an under plate 29. A valve 25 is placed between the gun 1 and the pre-enclosure 2. The gun is itself connected to pumping sets diagrammed at 12 and 13 which respectively designate a turbomolecular pump and a primary vacuum pump is such a manner that the gun 1 is maintained under a high vacuum of approximately $10^{-5}$ torr.

The pre-enclosure 2 is itself connected by means of pipes 26 to a pumping set 27 which comprises a roots pump and a primary pump. The pumping set 27 is used to obtain a nearly permanent vacuum of approximately $10^{-2}$ torr in said enclosure. Each welding chamber 3 and 4 is connected to the pre-enclosure 2 by means of valves 31 and 32 respectively which are, of course, located opposite the oval opening 23 in the pre-enclosure 2, and each welding chamber 3 and 4 is connected to respective individual primary pumping mechanisms 5 and 6. The mechanisms 5 and 6 serve to selectively pre-evaluate the chambers at about 1 torr.

Figure 4:
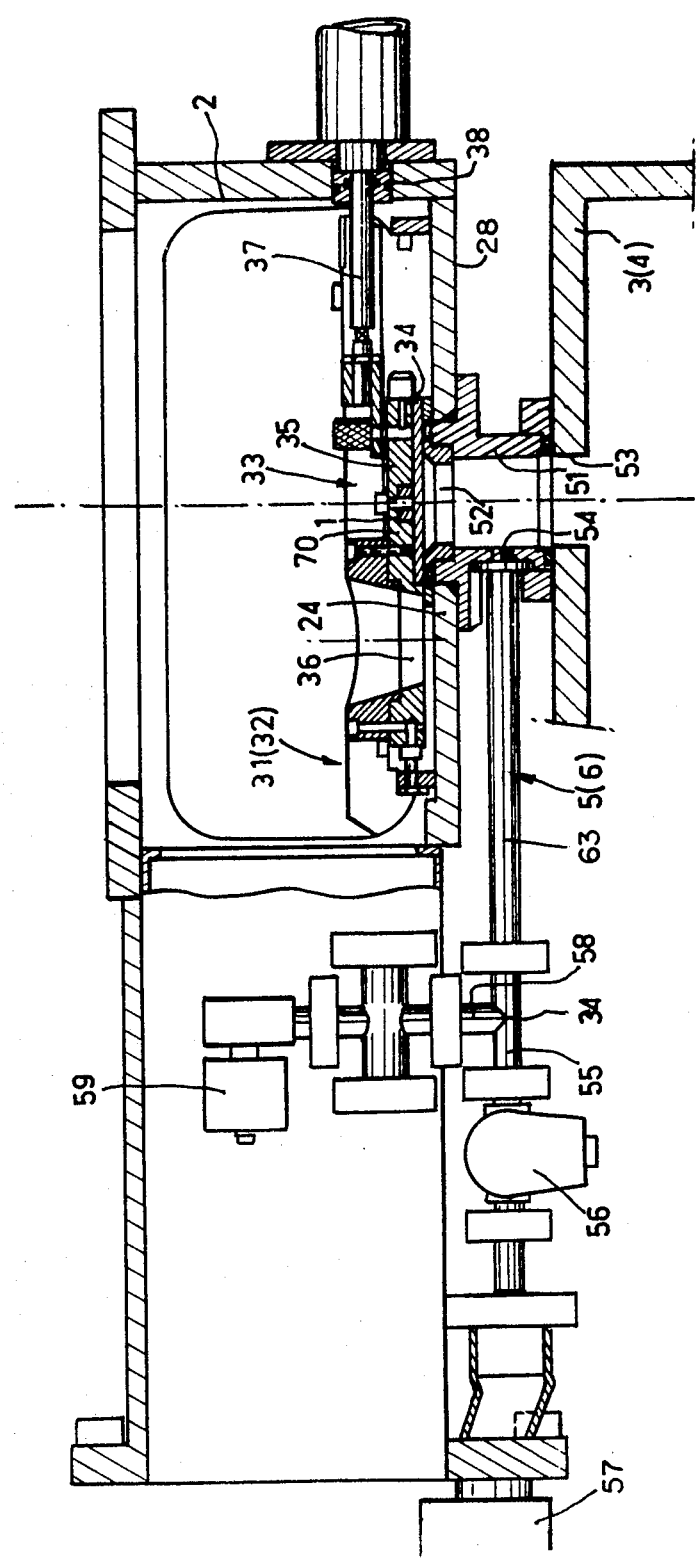
FIG. 4 is a detailed cross-sectional view of a chamber evacuating mechanism for the apparatus.

Referring to FIG. 4, it can be seen that a pump mechanism 5 (or 6) includes a tubular collar 51 communicating with the pre-enclosure 2 and the welding chamber 3 (or 4). One side of the collar 51 is mounted inside and around an orifice 52 in a lower wall 28 of the pre-enclosure 2, and the other side of the collar is mounted inside and around an orifice 53 in the welding chamber 3 (or 4).

The orifice 52 on the pre-enclosure 2 is fitted with a valve 31 (32) carried by a movable carriage 33. The carriage 33 is made up here of a closing plate 34 secured to a support 35 with an opening 36. The support 35 is integral with a control jack rod 37 extending into the pre-enclosure 2 at a sealed junction 38. The valve 31 (or 32) is closed by plate 34 and is open when plate 34 is in such a position that opening 36 coincides with orifice 52.

The tubular collar 51 presents a lateral hole 54 which opens into a pipe 63, ending in a double branching, of which one branching 55 is connected by means of valve 56 to a pumping unit schematically represented in 57, while the other branching 58 is connected to a valve 59 for opening to atmosphere.

In the example shown in the drawings, each welding chamber 3 and 4 is made up here of a fixed part 40 and a movable loading system. The loading system includes a sealing cylinder 41 mounted on a fixed wall 42, and two doors 43 and 44. The door 43 is subject to normal displacement with respect to the plane of its corresponding opening in the welding chamber, while the door 44 is subject to parallel displacement with respect to its corresponding opening.

The two parts to be welded are represented here by a rod 81 and a piece 82 which is to be welded onto the end of the rod 81. The rod 81 is introduced through the sealing cylinder 41, and the piece 82 is at the same time brought opposite a gripping mechanism 83, which is mounted on the inside face of door 43. The doors 43 and 44 then closed and sealed, such that piece 82 comes into proper welding position against rod 81.

The operation of the apparatus described is as follows:

Referring to welding chamber 3, which is being loaded, and is consequently at atmospheric pressure, the valves 31 and 56 are maintained in their closed positions.

Parts to be welded (rod 81 and piece 82) are introduced, and chamber 3 is closed and sealed by inflating the sealing joints inside cylinder 41 and fluid-tight closing of doors 43 and 44.

Once this operation has been completed, chamber 3 is gradually evacuated by pumping unit 57 of device 5 (valve 56 open and valve 59 closed). Once this pre-evacuation operation has been completed and valve 56 is closed (with pressure in the chamber being approximately 1 torr) and the electron gun is opposite valve 31, the latter is open so as to rapidly complete evacuation in welding chamber 3 by means of the high vacuum in pre-enclosure 2. Once both vacuums have been equalized in the two chambers (pre-evacuation chamber 2 and welding chamber 3) at a value of about $5-10^{-2}$ torr (while, of course, valve 32 communicating with the other chamber 4 is closed), welding may be carried out by opening valve 25 of gun 1, and emitting an electron beam for a suitable period of time, with, of course, proper deflecting means being utilized so that the electron beam travels across the joint to be welded, and should need be, carries out various thermal operations.

Once the welding operation in chamber 3 has been completed, valve 25 of gun 1 is closed as is valve 31. Valve 59 of device 5 is opened, rapidly opening welding chamber 3 to atmosphere, at which time unloading may begin by opening doors 43 and 44 and removing the welded part through the opened face, which is normally closed by door 44. At the same time, gun 1 is displaced along the oval opening 24 so as to terminate opposite valve 32 and co-operate with welding chamber 4 which has just been subjected to the very same operations as were just carried out and described with reference to chamber 3, although not at the same time, such that a new welding operation may be immediately carried out on other parts previously placed inside welding chamber 4 which has itself been pre-evacuated.

We claim:

1. Electron beam vacuum welding process making use of a single electron gun maintained under a high vacuum and suited to being displaced between at least two positions separated in space and opposite welding chambers, and also making use of a vacuum pre-enclosure maintained nearly fulltime under a welding vacuum and periodically receiving the electron gun in such a fashion that the electron beam penetrates through the vacuum pre-enclosure and into one of said welding chambers, comprising the steps of displacing the electron gun from one of said positions to another of said positions, and at each of said positions carrying out the following operations in succession; loading a welding chamber with parts to be welded, sealing the thus loaded welding chamber, opening the loaded welding chamber to said pre-enclosure, to thereby reduce the pressure inside said welding chamber until it has attained a normal welding vacuum, placing said pre-enclosure in communication with the gun, directing a welding beam from the gun through the pre-enclosure toward said loaded welding chamber, thereafter closing off the electron gun from the pre-enclosure and the pre-enclosure from said welding chamber, and then opening and unloading the welding chamber.

2. Electron beam welding process according to claim 1, in which a pre-evacuation of said welding chamber to a pressure level higher than the pressure of said pre-enclosure is carried out subsequent to the sealing of said welding chamber, and before said chamber is opened to said pre-enclosure.

3. Electron beam welding process according to claim 2, characterized by the fact that a high vacuum of approximately $10^{-5}$ torr is maintained in the gun, while a vacuum of approximately $10^{-2}$ torr is maintained in the pre-enclosure and a vacuum of approximately 1 torr is reached in each of the individual welding chambers, before communication with the pre-enclosure.

4. Electron beam welding apparatus including an electron gun, means for displacing the electron gun from one welding position to at least another welding position, an elongated pre-enclosure including a pair of opposed faces, one of said faces being disposed opposite and next to the gun and having an oval hole around which the means of displacement for said gun are mounted, multiple welding chambers positioned opposite the other face of said pre-enclosure, said pre-enclosure communicating both with said gun through said oval opening, and with each of said welding chambers, and a plurality of separate pumping mechanisms respectively cooperating with the welding gun and with said pre-enclosure to selectively evacuate the same.

5. Welding apparatus according to claim 4, which further comprises at least one additional pumping mechanism associated with the welding chambers for evacuating the same.

6. Welding apparatus according to claim 5, characterized by the fact that the pumping mechanism associated with the welding chambers comprises a pair of pumping units individually associated with each welding chamber.

7. Welding apparatus according to claim 6, which further comprises a pair of tubular collars respectively connecting the pre-enclosure to the welding chambers, each of the tubular collars having a lateral hole communicating with one of the pumping units.

8. Welding apparatus according to claim 4, which further comprises means within each of said welding chambers for receiving parts to be welded and for maintaining the received parts in a stationary position therein prior to and during said selective evacuation and during the welding of said parts.

9. An electron beam vacuum welding process comprising, in combination:
loading a first welding chamber with parts to be welded;
sealing the thus loaded first welding chamber;
evacuating the first welding chamber, to provide a partial vacuum in said first chamber;
evacuating an intermediate chamber in fixed juxtaposition with the first welding chamber, to provide a high vacuum in said intermediate chamber;
evacuating an electron gun chamber in alignment with the first welding chamber and movably disposed with respect to the intermediate chamber, to provide a welding vacuum in said electron gun chamber;
opening the intermediate chamber to the first welding chamber to rapidly increase the vacuum in the first welding chamber to said high vacuum;
opening the electron gun chamber to the intermediate chamber while the latter is open to the welding chamber, to further increase the vacuum in the first welding chamber to said welding vacuum;
directing a welding beam from an electron gun within said electron gun chamber through the intermediate chamber to said first welding chamber, to thereby weld the parts in said first chamber;
thereafter closing off the electron gun chamber from the intermediate chamber and the intermediate chamber from the welding chamber;
then opening the welding chamber and unloading the parts therefrom;
shifting the electron gun chamber relative to the intermediate chamber from its position in alignment with the first welding chamber to a position in alignment with a second welding chamber; and
repeating the foregoing steps with respect to the second welding chamber to thereby weld parts within said second chamber, at least the loading of the second chamber taking place during the time a vacuum is maintained in the first chamber.

10. An electron beam vacuum welding process comprising, in combination:
loading a first welding chamber with parts to be welded;
sealing the thus loaded first welding chamber;
gradually evacuating the first welding chamber, to provide a partial vacuum in said first chamber;
continuously evacuating an intermediate chamber is fixed juxtaposition with the first welding chamber, to provide a high vacuum in said intermediate chamber;
evacuating an electron gun chamber in alignment with the first welding chamber and movably disposed with respect to the intermediate chamber, to provide a welding vacuum in said electron gun chamber;
opening the intermediate chamber to the first welding chamber to rapidly increase the vacuum in the first welding chamber to said high vacuum;
opening the electron gun chamber to the intermediate chamber while the latter is open to the welding chamber, to further increase the vacuum in the first welding chamber to said welding vacuum;
directing a welding beam from an electron gun within said electron gun chamber through the intermediate chamber to said first welding chamber, to thereby weld the parts in said first chamber, the parts being maintained in a stationary position within the first welding chamber from a time prior to the sealing thereof until after the completion of said weld;

thereafter closing off the electron gun chamber from the intermediate chamber and the intermediate chamber from the welding chamber;

then opening the welding chamber and unloading the parts therefrom;

shifting the electron gun chamber relative to the intermediate chamber from its position in alignment with the first welding chamber to a position in alignment with a second welding chamber; and repeating the foregoing steps with respect to the second welding chamber to thereby weld parts within said second chamber, at least the loading of the second chamber taking place during the time a vacuum is maintained in the first chamber.

* * * * *

UNITED STATES PATENT AND TRADEMARK OFFICE
CERTIFICATE OF CORRECTION

PATENT NO. : 4,251,708
DATED : February 17, 1981
INVENTOR(S) : Francois Corcelle and Jean M. Comane It is certified that error appears in the above-identified patent and that said Letters Patent are hereby corrected as shown below:

On the cover sheet, Assignee should read:

--LA SOUDURE AUTOGENE FRANCAISE, Paris, France--.

Signed and Sealed this

Seventh Day of July 1981

[SEAL]

Attest:

RENE D. TEGTMEYER

Attesting Officer    Acting Commissioner of Patents and Trademarks